United States Patent
Mansfield

(10) Patent No.: US 6,859,450 B1
(45) Date of Patent: Feb. 22, 2005

(54) METHOD FOR COORDINATED COLLISION AVOIDANCE IN MULTI-TRANSCEIVER FREQUENCY HOPPING WIRELESS DEVICE

(75) Inventor: Carl Mansfield, Portland, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 09/536,823

(22) Filed: Mar. 27, 2000

(51) Int. Cl.[7] .......................... H04B 7/208; H04Q 7/00
(52) U.S. Cl. .................... 370/344; 370/324; 370/330
(58) Field of Search ...................... 370/310, 310.2, 370/312, 319, 321, 324, 326, 328, 330, 338, 343, 344, 345, 347, 350

(56) References Cited

U.S. PATENT DOCUMENTS

| | | | |
|---|---|---|---|
| 5,410,538 A | 4/1995 | Roche et al. ............... 370/479 |
| 5,481,481 A | 1/1996 | Frey et al. .................... 702/82 |
| 5,548,582 A | 8/1996 | Brajal et al. ................. 370/206 |
| 5,781,536 A | 7/1998 | Ahmadi et al. .............. 370/252 |
| 5,790,587 A | 8/1998 | Smith et al. ................. 375/147 |
| 5,797,099 A | 8/1998 | Ejzak et al. ................. 455/466 |
| 6,292,475 B1 | * | 9/2001 | Swail .......................... 370/329 |
| 6,393,261 B1 | * | 5/2002 | Lewis ......................... 455/103 |
| 6,490,262 B1 | * | 12/2002 | Hogger ....................... 370/337 |

* cited by examiner

*Primary Examiner*—John Pezzlo
*Assistant Examiner*—Saba Tsegaye
(74) *Attorney, Agent, or Firm*—Robert D. Varitz, P.C.

(57) ABSTRACT

An improved method for preventing collisions in a multi-transceiver access point for use with frequency hopping RF transceivers includes determining the next channel frequencies to be used by each transceiver in the access point; and permitting only one transceiver to transmit on any particular channel frequency at any one time.

9 Claims, 4 Drawing Sheets

METHOD FOR COORDINATED COLLISION AVOIDANCE IN MULTI-TRANSCEIVER FREQUENCY HOPPING WIRELESS DEVICE

FIELD OF THE INVENTION

This invention relates to multi-media communications, and specifically to a method for preventing simultaneous transmission by more than one access point transceiver on the same frequency at the same time.

BACKGROUND OF THE INVENTION

Unlicensed wireless communications systems are required to comply with FCC part 15 rules. These rules limit the bandwidth of operation for frequency hopping systems, such as Bluetooth™ (BT) or HomeRF, resulting in limited system throughput and capacity per radio transceiver. Bluetooth™ is a trademark/service mark of Telefonaktiebolaget LM Ericsson, of Stockholm, Sweden, for telecommunication equipment, computer communication equipment, including radio modems; and telecommunication and computer communication services.

In order to enhance the capacity of a wireless access point (AP), it is possible to incorporate multiple radio transceivers into a single physical AP. In this case, each radio transceiver operates independently of the others inside the same AP. In frequency hopping systems, a radio transceiver will hop in a pseudo-random manner among a number of channel frequencies, using only one channel frequency at a time, e.g., BT hops in a pseudo-random manner among 23 or 79 channel frequencies, depending on regulations governing various geographic regions.

In multi-transceiver AP prior-art, each radio transceiver hops using a different pseudo-random sequence, selecting the next transmission channel frequency independently from the other transceivers. Occasionally two or more of the transceivers in the multi-transceiver AP will select the same channel frequency, resulting in a channel frequency collision. In the event of such a channel frequency collision, the multiple transmissions on the same channel frequency will totally corrupt each other, which will result in none of the colliding transmissions being able to be correctly received and decoded.

The known prior art does not attempt to avoid this kind of collision, but rather relies on error recovery techniques to prevent loss of data integrity, such as backward error correction schemes to subsequently recover the corrupted data. Any unsuccessful transmission will result in the generation of a negative acknowledgements (NACK), which is sent back to the AP. On receipt of such NACKs, the AP will re-transmit the corrupted data, allowing it to be fully recovered. Such prior art systems rely on the fact that channel frequency collisions are rare, and that by the time of re-transmission each AP transceiver has hopped to new, independently selected channel frequency where repeat collision is unlikely, due to the pseudo-random nature of the hopping process. Thus, prior art systems use random hopping and repeat transmissions to provide robust operation. The effect of collisions is loss of system performance: reduced throughput and increased delay.

U.S. Pat. No. 5,410,538, for Method and apparatus for transmitting signals in a multi-tone code division multiple access communication system, granted Apr. 25, 1995 to Roche et al., describes multi-tone CDMA and OFDM, and is related to specifics of design and implementation of this modulation technique.

U.S. Pat. No. 5,481,481 for Automated diagnostic system having temporally coordinated wireless sensors, granted Jan. 2, 1996 to Frey et al., describes a tester for diagnosis of a distributed system. The tester coordinates inputs from loggers at each of the disparate components of the system.

U.S. Pat. No. 5,548,582 for Multicarrier frequency hopping communications system, granted Aug. 20, 1996 to Brajal et al., describes a multi-carrier FH system and signal processing techniques for decoding the transmissions using Fourier Transforms.

U.S. Pat. No. 5,781,536 for Allocation method and apparatus for reusing network resources in a wireless communication system, granted Jul. 14, 1998 to Ahmadi et al., describes a system where multiple WLAN access points at different geographical locations have central resource coordination to allow effective distribution of resources among the access points according to demand.

U.S. Pat. No. 5,790,587 for Multi-band, multi-mode spread-spectrum communication system, granted Aug. 4, 1998 to Smith et al., describes a specific system which uses TDMA, CDMA and FDMA.

U.S. Pat. No. 5,797,099 for Enhanced wireless communication system, granted Aug. 18, 1998 to Ejzak et al., describes a system with coordination between AMPS (analog voice) and CDPD (packet data) services.

SUMMARY OF THE INVENTION

An improved method for preventing collisions in a multi-transceiver access point for use with frequency hopping RF transceivers includes determining the next channel frequencies to be used by each transceiver in the access point; and permitting only one transceiver to transmit on any particular channel frequency at any one time.

It is an object of this invention to provide a method of preventing collisions and the resulting data corruption in multi-transceiver access points used in frequency hopping protocols.

Another object of the invention is to provide a method of increased throughput and reduced delays by preventing collisions between transceivers in an access point.

This summary and objectives of the invention are provided to enable quick comprehension of the nature of the invention. A more thorough understanding of the invention may be obtained by reference to the following detailed description of the preferred embodiment of the invention in connection with the drawings.

DETAILED DESCRIPTION OF THE PREFERRED EMBODIMENT

Figure 1:
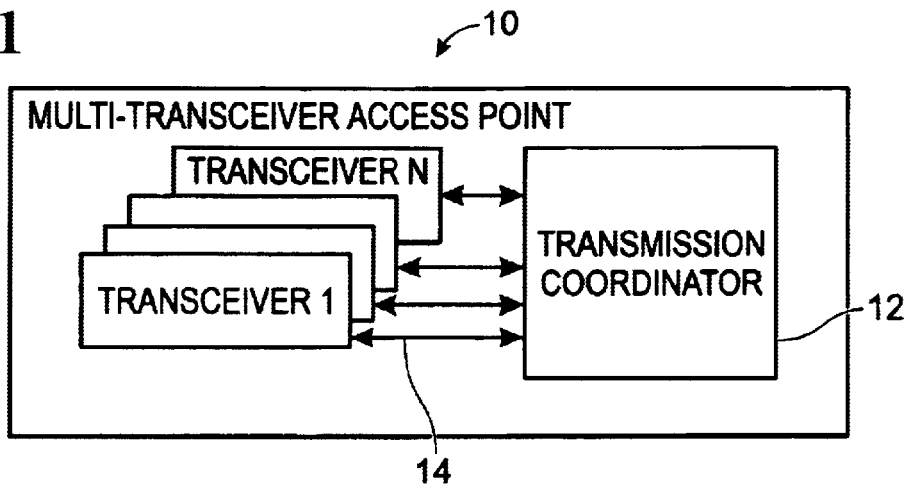
FIG. 1 depicts a multi-transceiver access point connected to a transmission coordinator of the invention.

Referring initially to FIG. 1, a multi-transceiver access point is depicted at 10, wherein access point 10 is part of a frequency hopping system. Access point 10 has transceivers 1 . . . N. A transmission coordinator 12 is shown, which functions as a traffic control device, and which will be explained in greater detail later herein. This invention avoids collisions between transceivers located in the same multi-transceiver access point (AP) by allowing only one of the competing transceivers to transmit when such a collision would otherwise occur. In so doing, at least one communication is successful, while the other transmissions are held for future transmission, or discarded. This improves system performance.

It is possible to produce a multi-transceiver device, such as a Bluetooth™ AP, with more than one transceiver in order to provide greater throughput capacity than would be possible with a single transceiver AP. If such a device incorporates a frequency hopping technology, for example, operating in the unlicensed ISM band, each transceiver hops independently of the others among the available channel frequencies. The Bluetooth™ specification is used as an exemplar protocol in describing this invention. Bluetooth™ (BT) is a short-range communications specification, designed for operation in the 2.4 GHz microwave frequency industrial, scientific and medical (ISM) band. BT devices operate in accordance with the FCC Part 15 rules for unlicensed operation. Part 15 rules require the use of spread spectrum techniques, either frequency hopping or direct sequence. The BT specification is no exception, and has adopted a frequency-hopping scheme. BT hops in a pseudo-random manner among the 79 different channel frequencies in the ISM band, at a rate of 1600 hops per second. As every BT device operates in the same pseudo-random sequence, once master clock information is known and all BT devices are synchronized, all the BT devices linked to each other will select the same channel frequency. BT communication is packet based. Basic BT operation uses "single slot" packets, referred to as DMI (data-medium rate) and DHI (data-high rate) packets, which each occupy a single 0.625 ms frame, or slot. In order to provide higher data rates and asymmetric data transfers, BT supports additional packet types, which occupy either three contiguous BT slots, and are referred to as DM3 and DH3 packets, or five contiguous BT slots, and are referred to as DM5 and DH5 packets.

Referring again to FIG. 1, if each of the N transceivers in AP 10 selects a different channel frequency, then none of the N transmissions will collide with each other and all of the data transmissions will be successful, pending other channel frequency conditions between the access point and the intended recipient.

However, there will be times when one or more of the transceivers select the same channel frequency for transmission. If more than one transceiver attempts to use the same channel, the multiple transmissions on that channel frequency will corrupt one another completely, and no transmission will be successful. The corrupted data will later be recovered by standard backward error correction techniques, i.e., re-transmission. Because the hopping patterns are random, prior art systems rely on both the statistical improbability of collisions and on re-transmissions to provide robust communication. However, the collisions and required re-transmissions result in a drop in system throughput and extra delay, even though the communication is robust.

The method of the invention provides a mechanism whereby collisions are avoided. Still referring to FIG. 1, arrow 14, for instance, includes a signal from transceiver 1 to transmission coordinator 12, which provides information to allow the transmission coordinator to determine the next channel frequency that transceiver 1 will use, i.e., a look-ahead capability. All other transceivers provided transmission coordinator 12 with similar information, thereby allowing transmission coordinator 12 to determine if any two or more transceivers are about to transmit on the same channel frequency. Transmission coordinator 12 has the ability to send a "hold" signal, or flag, to the transceivers of access point 10, instructing one or more of the transceivers to hold its next transmission.

Figure 2:
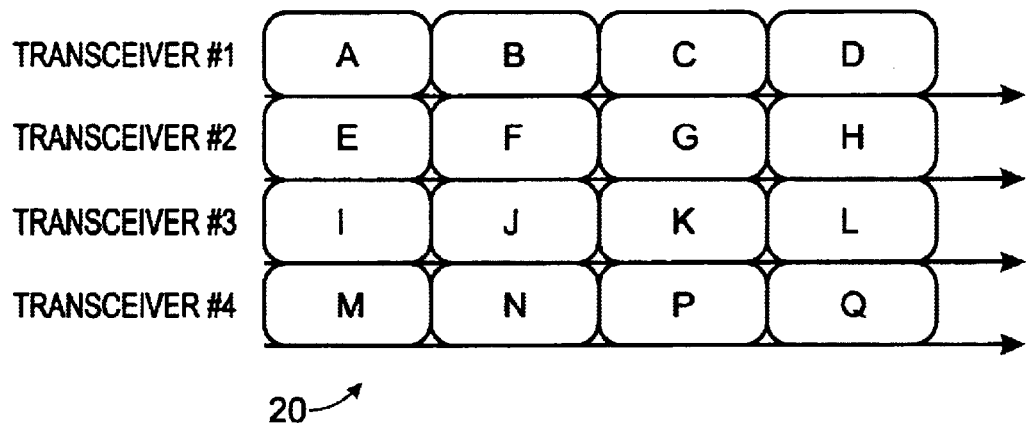
FIG. 2 depicts a slot synchronized transmission protocol.

Assuming random hopping distribution among the available channels, which is a valid approximation because the hopping patterns are designed to be pseudo-random; and also assuming transmission slot alignment, or synchronization, and single-slot packet length, as depicted in FIG. 2, generally at 20, it is then clear that any of the transmissions from the N transceivers, such as transceiver 1 using channel frequency A in the first depicted slot, will not suffer collision with any of the other transmissions from the N−1 transceivers, provided all of the transceivers select one of the other 78 channel frequencies. So, the probability that any one particular transceiver does not have a collision with any of the other N−1 transceivers is $$\left(\frac{78}{79}\right)^{(N-1)}.$$

This assumes all of the transceivers co-located in AP 10 transmit in a slot-synchronized manner, i.e., all slots for the transceivers are aligned in time.

Figure 3:
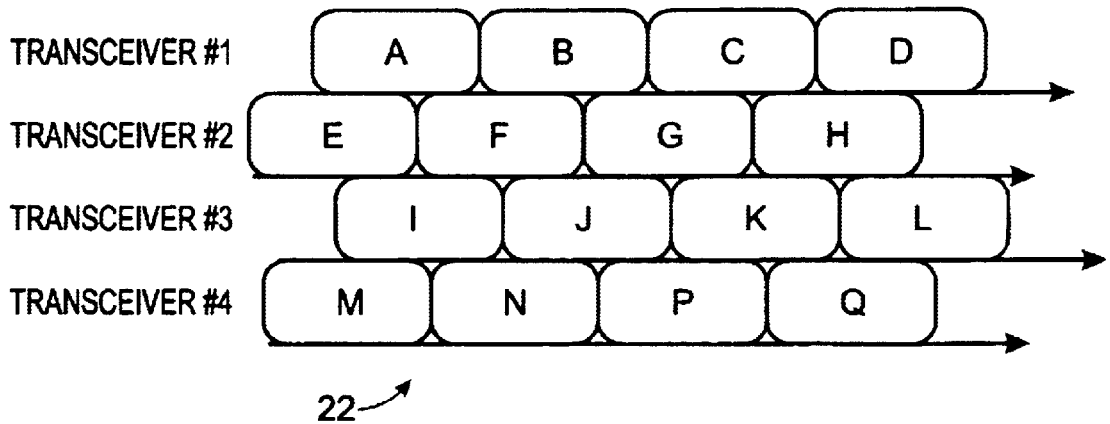
FIG. 3 depicts a non-slot synchronized transmission protocol.

If the transmission of each transceiver are not slot synchronized, as depicted in FIG. 3, the probability of collision increases. As shown in FIG. 3, generally at 22, the transceivers transmit in route step fashion, i.e., non-synchronized, wherein the beginnings of transmission packets by each transceiver occur as determined by the transceiver. It is clear from FIG. 3, for example, that the transmission on channel frequency A made by transceiver 1 overlaps the transmission on both channel frequency E and channel frequency F, made by transceiver 2. If either transmission E or F occur on the same channel frequency as transmission A, a collision will occur, corrupting the transmission of transceiver 1. Thus, each transceiver must account for potential collisions in two adjacent slots of all other non slot synchronized transceivers. The two adjacent slots are those two slots which partially overlap the slot of a particular transceiver. Thus, the probability that a transceiver transmitting in a slot is collision free is $$\left[\left(\frac{78}{79}\right)^{N-1}\right]^2 = \left(\frac{78}{79}\right)^{2(N-1)}.$$

Figure 4:
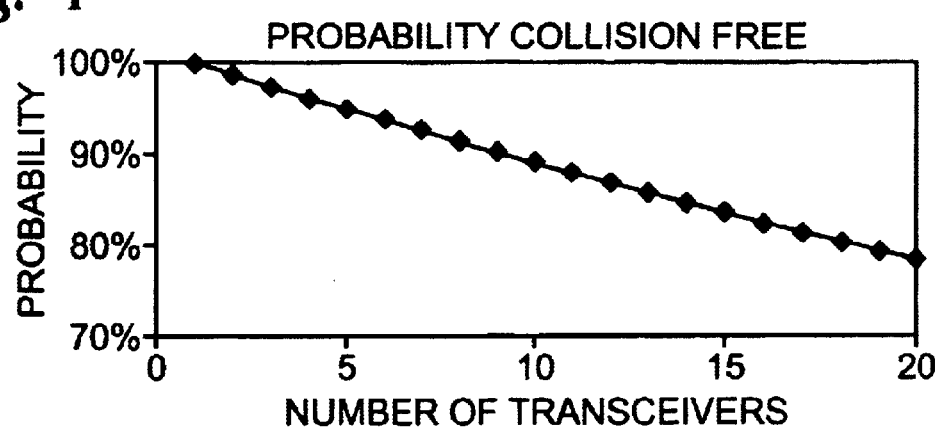
FIG. 4 is a graph of collision probability as a function of the number of transceivers for a slot-synchronized transmission protocol.

Referring now to FIG. 4, it is clear that the percentage of collisions will rise as the number of co-located transceivers increases. Each of the N transceivers will have collision free channel frequency selection according to the line of the graph for a slot-synchronized transmission protocol. For each collision, a repeat transmission must be made. This results in a data throughput drop because data must be sent more than once in order to achieve successful transmission. In addition, repeat transmissions result in additional delays.

Figure 5:
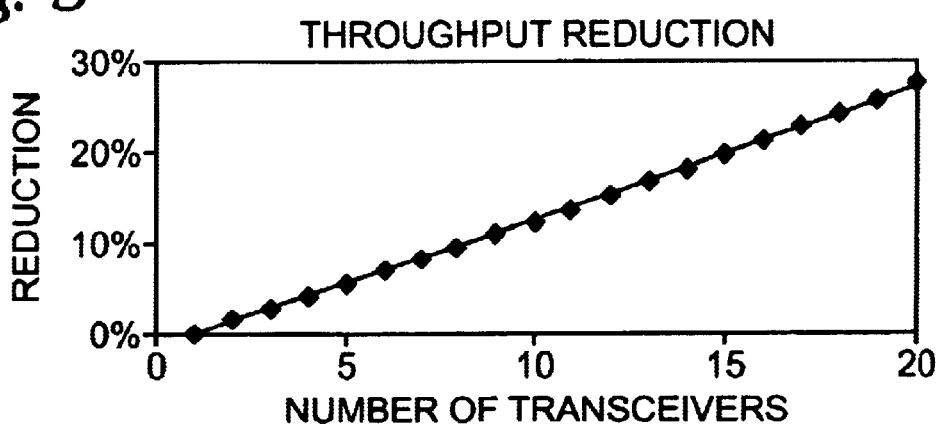
FIG. 5 is a graph of throughput reduction as a function of the number of transceivers for a slot-synchronized transmission protocol.

The net throughput reduction is illustrated in FIG. 5 for the case of slot synchronized transmission. This throughput reduction begins to become significant as more transceivers are added. Instead of allowing these transmission collisions to occur, this invention coordinates the baseband/physical layer processors of each of the transceivers.

A management function, transmission coordinator 12 of FIG. 1, is added to multi-transceiver access point 10. This transmission coordination function looks at the next transmissions to be made by each of the N transceivers and determines if any of the next N transmissions will be made simultaneously on the same channel frequency. Note that it is not necessary for the N transceivers to be slot synchronized. If they are not, then the transmission coordinator must take account of the relative slot timings of the N transceivers to determine if any collisions are about to occur.

If the transmission coordinator detects that one or more collisions are about to occur, each comprising a collision of two or more transceivers, it will take action to prevent the collision from occurring by permitting only one transceiver to transmit on any one channel frequency.

The transmission coordinator does this by sending a transmission control flag to each of the transceivers. This flag is set to one of two possible states (1) OK to transmit, or, a transmit signal; or (2) hold transmission, or, a hold transmission signal. If a transceiver receives a hold flag, then it will not attempt to transmit the next scheduled packet, but instead will be instructed to hold the packet in a buffer, or queue, until it is sent an "OK to transmit" flag. Alternately, the transceiver may be instructed to discard the packet which would have been transmitted.

The transmission coordinator incorporates an algorithm to determine how the flag setting should be made. The essential characteristic of this algorithm is that, for every potential collision, it sets the "OK to transmit" flag on only one of the colliding transceivers, while setting the flag(s) on the other colliding transceivers to "hold transmission." This means that only one of the potential colliding transmissions is made, resulting in potential successful reception of this chosen transmission, pending other channel frequency conditions between this transceiver and the intended recipient.

To determine the next channel frequency to be used by each transceiver in the AP, each transceiver sends channel frequency information to transmission coordinator 12. The transmission coordinator may (1) receive a signal from each of the transceivers in the associated AP providing information as to which channel frequency each transceiver will next transmit on, which will require non-prior art transceiver hardware and software, or, (2) the transmission coordinator may incorporate a master clock which will enable the transmission coordinator to determine internally, from knowing the master clock setting and device identification of each its transceiver, which channel frequency each transceiver will next transmit on. This latter embodiment may enable use of prior art transceivers with only a minor software change. Thus, the information transmitted to transmission coordinator 12 may be the actual channel frequency identify, or master clock information. What should be noted is that the look-ahead capability of the transmission coordinator must be equal to the maximum packet length used in the AP, e.g., three slots if three slot packets are allowed.

So, in essence, for every potential collision, one of the potential colliding transmissions can be made successfully while the others are lost. In the prior art, without this coordination, all of the transmissions are lost because they destructively collide.

Figure 6:
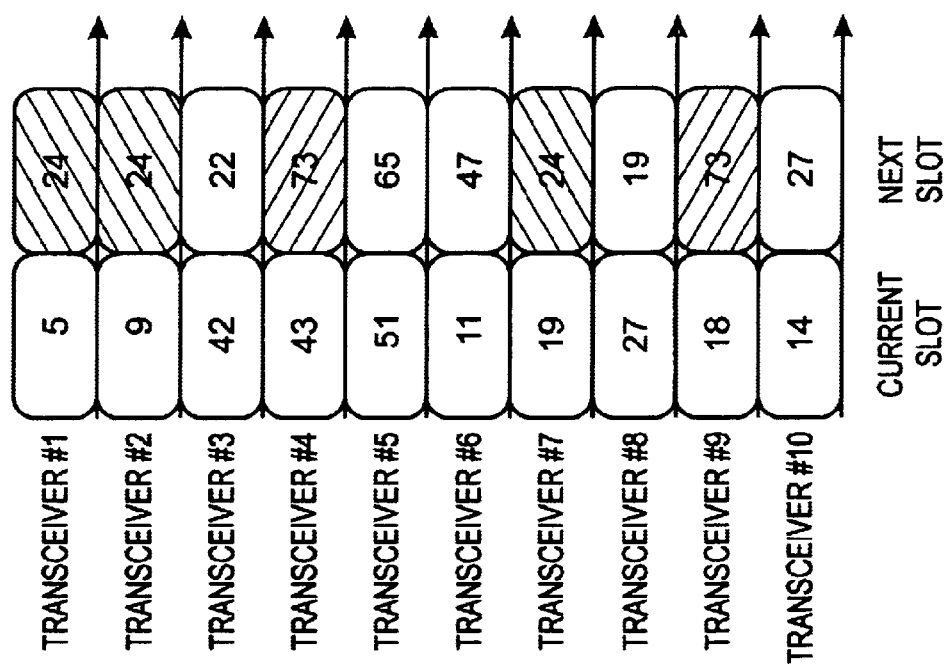
FIG. 6 depict a collision situation in an access point for a slot synchronized transmission protocol.

Consider the following example for a slot synchronized AP, referring to FIG. 6: A transceiver access point 30 is about to make the transmissions for the next frame, or transmission slot. It is apparent that no collisions occurred in the current slot, so presumably, all of the packets-transmitted in the current slot were received, and there is no need for retransmission of any packets in the next slot. Of the chosen channel frequencies for the transmission slot, transceivers 1,2 and 7 have selected the same channel frequency, e.g., channel frequency 24. Transceivers 4 and 9 have also selected the same channel frequency, e.g., channel frequency 73. The other transceivers, 3, 5, 6, 8, 10, have all selected different channel frequencies. In systems not incorporating the method of the invention, five transmissions are lost, because transmissions from transceivers 1,2,7 collide with each other and transmissions from transceivers 4, 9 have a separate collision with each other. So, in the following slot frame, 50% of the intended transmissions will be lost without the method of the invention.

Figure 7:
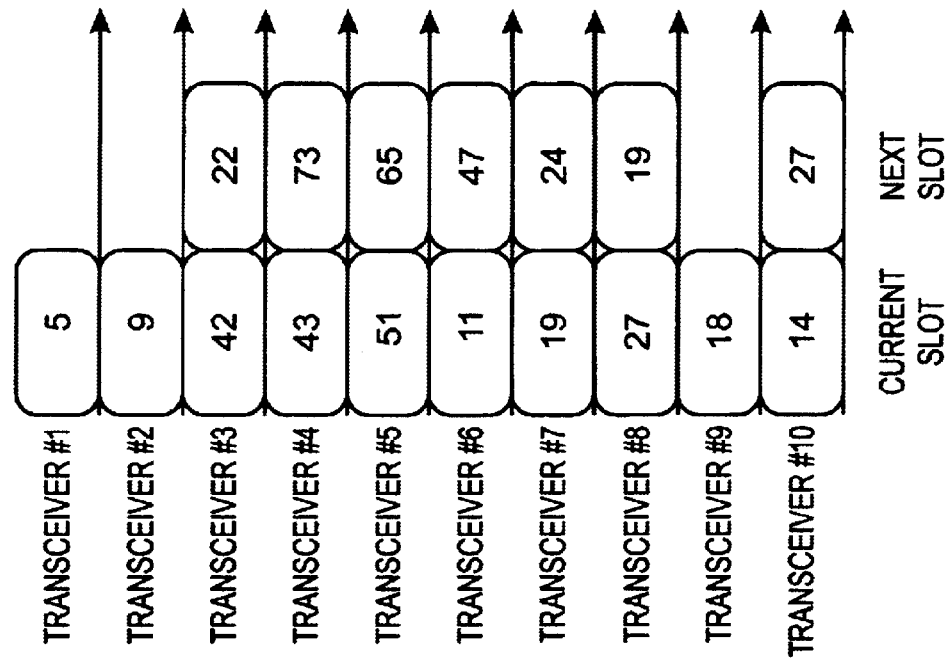
FIG. 7 depict how the method of the invention avoids the collision situation of FIG. 6.

Having received channel frequency information from transceivers 1 through 10 during the current slot, transmission coordinator 12 looks-ahead to the next overlapping, or colliding, transmissions in the next slot. It determines that transceivers 1, 2 and 7 are about to collide on channel frequency 24, and that transceivers 4 and 9 are about to collide on channel frequency 73. Because this AP is slot synchronized and all the transceivers are using one-slot packets, transmission coordinator 12 need only look-ahead one transmission slot. As a result of the determination by transmission coordinator 12, hold transmission signals are sent to transceivers, for instance, 1, 2 and 9, while OK to transmit signals are sent to the remaining seven transceivers. This results in transceivers 1, 2 and 9 making no transmission, as shown in FIG. 7.

With the method of the invention in place, transmission coordinator 12 requests, for instance, transceivers 1, 2 and 9 to hold the about-to-be transmitted packets, resulting in loss of only three packets. Transmission from transceivers 7 and 4 will be successful, pending other channel frequency conditions between transceiver and intended receiver, because these packets no longer collide with the other transmissions.

The intended recipients of the transmissions which were "on hold" will not successfully decode the transmission which was made on their channel frequency, as the transmitted packet has the wrong target device address and different encryption than the intended transmission. These intended recipients will either ignore the transmission or assume it was corrupted and request repeat transmission in the normal manner. In this scenario, 70% of the transmissions can succeed, pending other channel frequency conditions, between the AP and the intended recipients. Thirty percent of the transmission are held pending a request for retransmission. Thus, in this example, with the method of the invention, about 30% of the throughput is lost, compared with a 50% loss under the prior art method of collision and retransmission.

Figure 8:
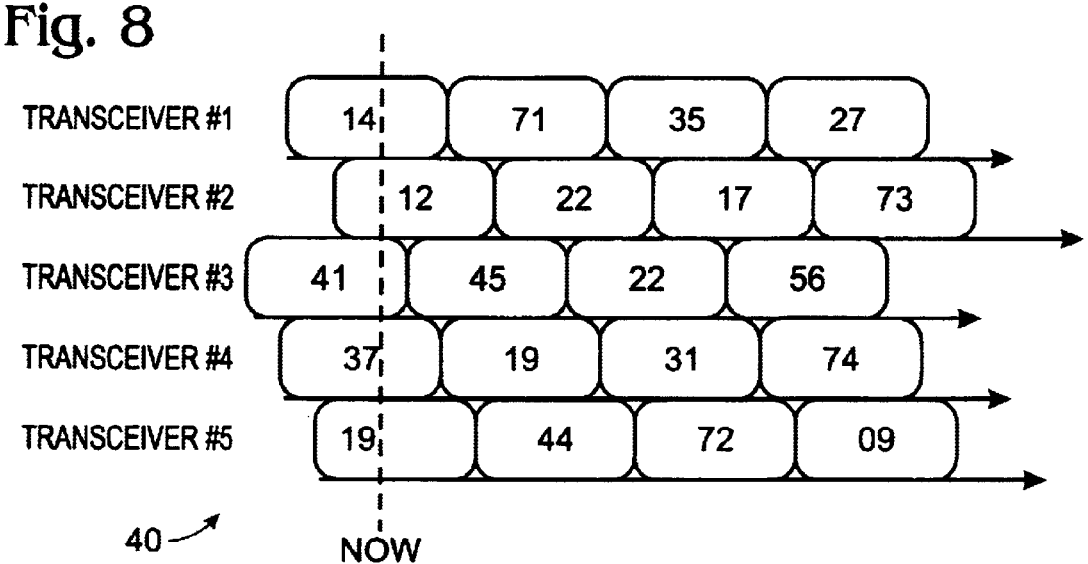
FIG. 8 depict a collision situation in an access point for a non-slot synchronized transmission protocol.

Referring now to FIG. 8, a non-slot synchronized transmission case for a five transceiver AP 40 is depicted. Again, an assumption is made that the packets are all one-slot in length. In this scenario, transmission coordinator 12 must look ahead by two transmission slots. If multi-slot packets are used, transmission coordinator 12 must look ahead by two times the maximum packet length. A collision occurs if any part of a transmission of separate transceivers overlaps, referred to herein as a partial slot overlap.

Figure 9:
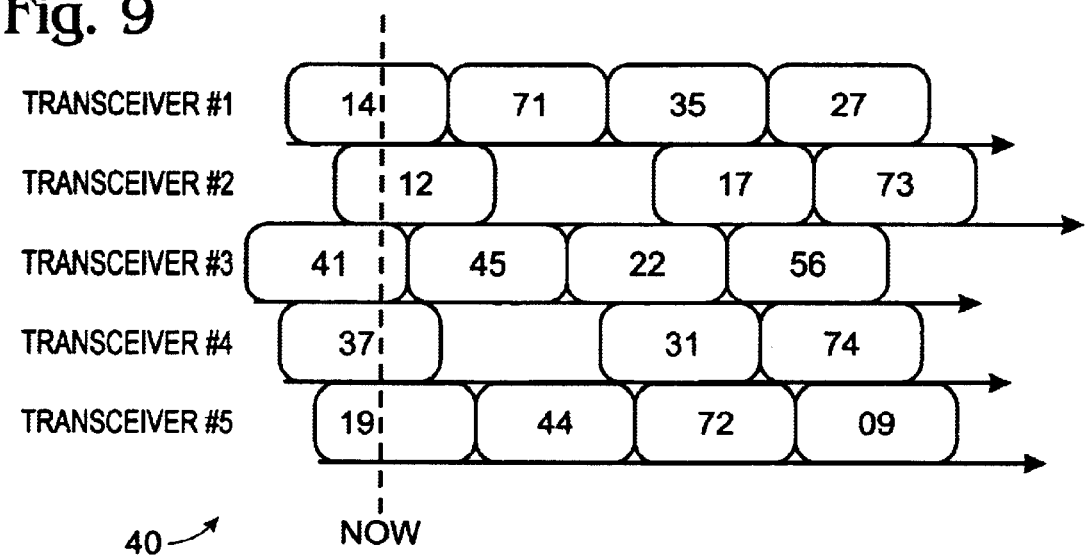
FIG. 9 depict how the method of the invention avoids the collision situation of FIG. 8.

FIG. 8 depicts five transceivers at various stages of transmission at the point marked "now." Looking ahead by two slots, it is seen that the end of transmission by transceiver 5 on channel frequency 19 will collide with the beginning of transmission by transceiver 4 on channel frequency 19, and that the end of the transmission of transceiver 2 on channel frequency 22 will collide with the beginning of transmission by transceiver 3 on channel frequency 22. As shown in FIG. 9, the transmission of "hold" signals to transceivers 2 and 4 results in the collision free transmission by transceivers 3 and 5.

In the case on non-slot synchronized transmission, the decision algorithm must have sub-slot granularity, e.g., the determination of the look-ahead channel frequencies must occur more than once per slot, and will generally be set to look-ahead every tenth to hundredth of a slot. Looking ahead once per slot is sufficient for a slot synchronized transmission protocol.

The determination of which transceivers have priority in an AP may be based on the type of communications handled by a particular transceiver, i.e., a transceiver carrying voice traffic may be given priority because of the difficulty of retransmitting voice carrying packets. Other packet types may be given priority according to user or system decisions to give a packet having a predetermined characteristic priority. Otherwise, a first-come, first serve protocol may be employed, or a protocol which evenly distributes transmission between the AP transceivers may be used.

A variety of algorithms may be used in transmission coordinator 12. The key point is that the algorithm is designed to prevent all but one of potentially colliding transmissions on a given channel frequency to be held, so that at least one transmission can be made.

The actual transmission coordinator algorithm may take several forms, for example. The algorithm may randomly select the "OK to transmit" transceiver, to provide fairness amongst the transceivers in the AP. The algorithm may store historical statistics to make sure "hold transmissions" are evenly distributed amongst the transceivers for fairness. Alternately, the algorithm may give priority status to a particular transceiver transmitting packets requiring better Quality of Service, e.g., voice transmitting packets.

The invention is generally applicable to access points, because multiple transceivers are needed to gain enough capacity. However, the invention may be applied to any device with multiple ISM band transceivers. The invention is further applicable to all frequency hopping technologies, although it is most applicable to ISM band technology, such as HomeRF SWAP-Ca or Bluetooth™.

The transmission coordinator may be implemented in hardware or software, although the invention is independent of the actual hardware/software architecture. For example, the flags could be hardware signaled to separate transceiver modules, or a software flag may be provided in a fully integrated device.

Thus, a method for coordinated collision avoidance in multi-transceiver frequency hopping wireless device has been disclosed. It will be appreciated that further variations and modifications thereof may be made within the scope of the invention as defined in the appended claims.

I claim:

1. In a multi-transceiver access point for use with frequency hopping RF transceivers, an improved traffic control method for preventing transmission collisions between transceivers in the access point on a channel frequency, wherein a channel frequency is a RF frequency within a communications channel, the improvement comprising:

determining the next channel frequencies to be used by each transceiver in the access point, including transmitting channel frequency information by each transceiver in the AP to a transmission coordinator; and permitting only one transceiver to transmit on any particular channel frequency at any one time, including generating a hold transmission signal, including generating a signal instructing a recipient of the hold transmission signal to hold its about-to-be transmitted packet pending receipt of a request to transmit the packet and instructing all but one of any transceivers set to transmit on the same channel frequency to hold its transmission.

2. The method of claim 1 wherein generating a hold transmission signal includes generating a signal instructing a recipient of the hold transmission signal to discard its about-to-be transmitted packet.

3. The method of claim 1 wherein said permitting includes tracking hold transmission signals to distribute hold transmission signals amongst all transceivers.

4. The method of claim 1 wherein said permitting includes giving priority to transceivers transmitting packets have predetermined characteristics.

5. The method of claim 1 wherein said transmitting includes transmitting the identity of the next channel frequencies to be used by each transceiver.

6. The method of claim 1 wherein said transmitting includes transmitting master clock information and device identification from each transceiver to the transmission coordinator.

7. In a multi-transceiver access point for use with frequency hopping RF transceivers, an improved traffic control method for preventing transmission collisions between transceivers in the access point on a channel frequency, the improvement comprising:

transmitting, by each transceiver, of channel frequency information to a transmission coordinator;

determining, by the transmission coordinator, the next channel frequencies to be used by each transceiver in the access point; and permitting only one transceiver to transmit on any channel frequency including generating a hold transmission signal instructing all but one of any transceivers set to transmit on the same channel frequency to hold its transmission, and wherein generating a hold transmission signal includes generating a signal instructing a recipient of the hold transmission signal which is not required to transmit to discard its about-to-be transmitted packet: wherein said permitting includes tracking hold transmission signals to distribute hold transmission signals amongst all transceivers and includes giving priority to transceivers transmitting packets which packets have predetermined characteristics.

8. The method of claim 7 wherein said transmitting includes transmitting the identity of the next channel frequency to be used by each transceiver.

9. The method of claim 7 wherein said transmitting includes transmitting master clock information and device identification from each transceiver to the transmission coordinator.

* * * * *